United States Patent
Wu

(10) Patent No.: US 6,309,082 B1
(45) Date of Patent: Oct. 30, 2001

(54) AUTOMATIC TURNING HEAD LIGHT STRUCTURE

(76) Inventor: Tien-Ching Wu, No. 41-5, Teng-Peng, 4 District, Lan-Keng, Tao-Fen Town, Maio-Li (TW)

( * ) Notice: Subject to any disclaimer, the term of this patent is extended or adjusted under 35 U.S.C. 154(b) by 0 days.

(21) Appl. No.: 09/401,273

(22) Filed: Sep. 23, 1999

(51) Int. Cl.⁷ ...................................................... B60Q 1/12
(52) U.S. Cl. .............................................. 362/37; 362/53
(58) Field of Search .................................. 362/37, 49, 53, 362/41, 50, 465, 467

(56) References Cited

U.S. PATENT DOCUMENTS

| | | | |
|---|---|---|---|
| 4,340,928 | * | 7/1982 | Hohmann, Jr. .......................... 362/49 |
| 5,099,400 | * | 3/1992 | Lee ......................................... 362/37 |
| 5,416,465 | * | 5/1995 | Lin ......................................... 362/37 |
| 5,588,733 | * | 12/1996 | Gotou ..................................... 362/37 |
| 5,868,488 | * | 2/1999 | Speak et al. ........................... 362/37 |
| 6,024,472 | * | 2/2000 | Tseng ..................................... 362/37 |

* cited by examiner

*Primary Examiner*—Sandra O'Shea
*Assistant Examiner*—Peggy L Neils
(74) *Attorney, Agent, or Firm*—Rabin & Berdo, P.C.

(57) ABSTRACT

An automatic turning headlight structure includes a headlight structure, a running gear and a server, the headlight structure being mounted through a rotatable main shaft at the front side of the car. The server is placed inside the headlight structure, and connected by a shaft with the main shaft. The server receives a signal to turn and to transmit a force to the shaft to drive the main shaft to make the headlight turn left or right, following the movement of the steering wheel.

8 Claims, 7 Drawing Sheets

AUTOMATIC TURNING HEAD LIGHT STRUCTURE

FIELD OF THE INVENTION

The present invention involves an automatic turning headlight structure, especially an improved headlight structure that will turn to the left side or the right side following the steering wheel.

BACKGROUND OF THE INVENTION

A conventional car (automobile) headlight structure is located on the front or back end of the vehicle, and when driving at night or in a dark area, the light will beam forward so that the driver can see the front area, but when the driver wants to turn toward the left or right side of the road, the headlight still beams straight forward and the light will not beam at the left or right side. When the driver is turning to the other side, there will be a short period that the driver does not get enough light to see ahead, as a result of which the driver cannot see the barrier at the left or right side, which is very dangerous for driving. For this reason, the inventor has made some improvements upon the conventional headlight structure to avoid this inconvenience and danger, that is, an automatic turning headlight structure that make driving more safe and increases the driver's vision at night.

SUMMARY OF THE INVENTION

The major object of the invention is to provide an automatic turning headlight structure that may provide greater safety when driving at night. The steering wheel has a running gear. The running gear includes a compact gear wheel speed changing box. The gear wheel speed changing box can follow the turning of the steering wheel to drive a variable resistor, causing transmission of a signal to the drive circuit of a server. In response, the server controls the turning of the headlight so that the headlight will follow the movement of the steering wheel as it turns left or right. Another object of the invention is to provide a simple automatic turning headlight structure that is mounted by a main shaft at the front side of the car, with a server being placed inside of the headlight structure, connected by a shaft with the main shaft. The server receives a signal to turn and to transmit to the shaft a force to drive the main shaft to make the headlight turn.

The objects, characteristics and functions of the present invention can be best described in detail in conjunction with the accompanying drawings and the following embodiment hereinafter.

DETAILED DESCRIPTION OF THE INVENTION

Figure 1:
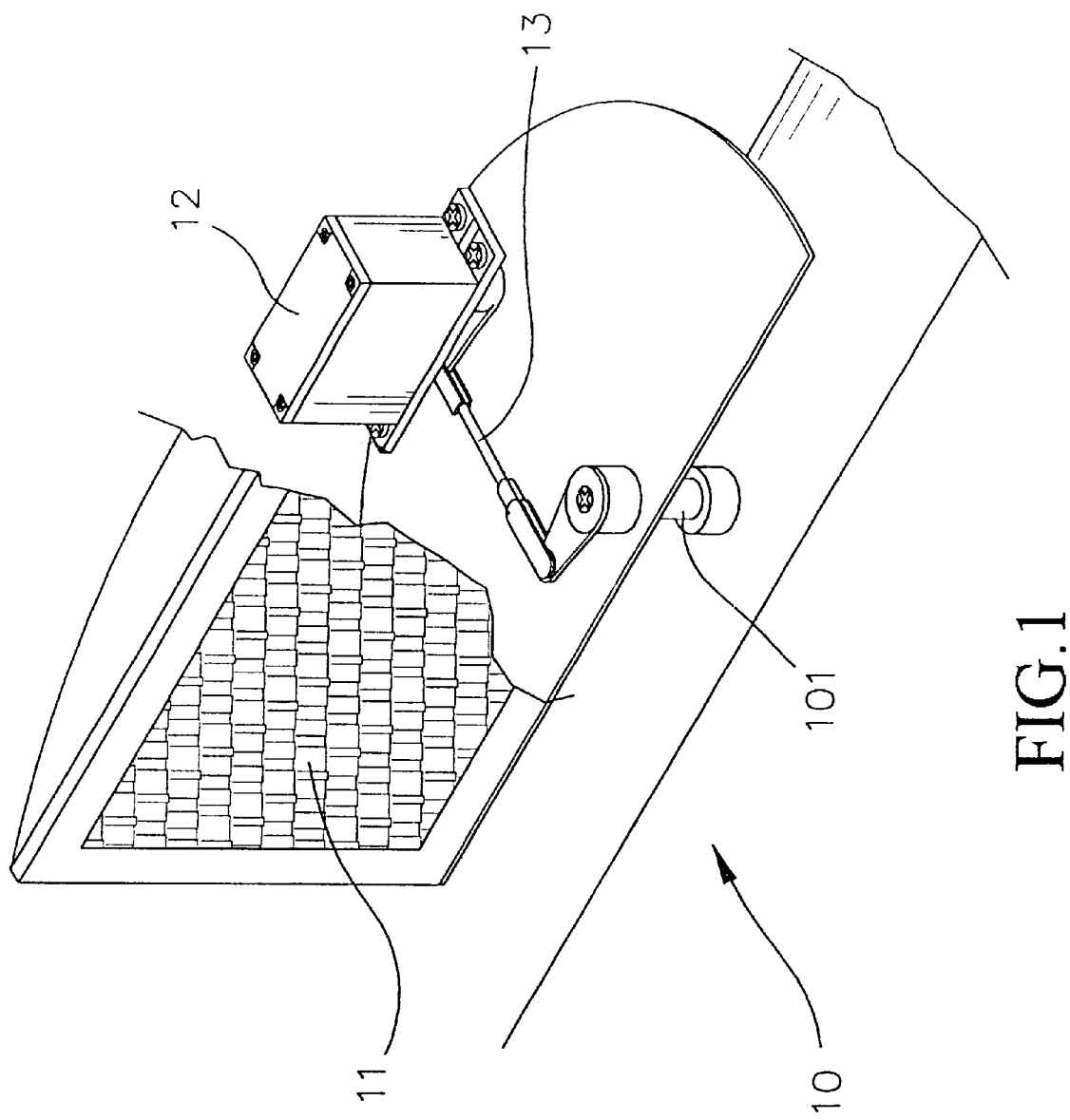
FIG. 1 is a schematic view of the present invention head light structure.
Figure 2:
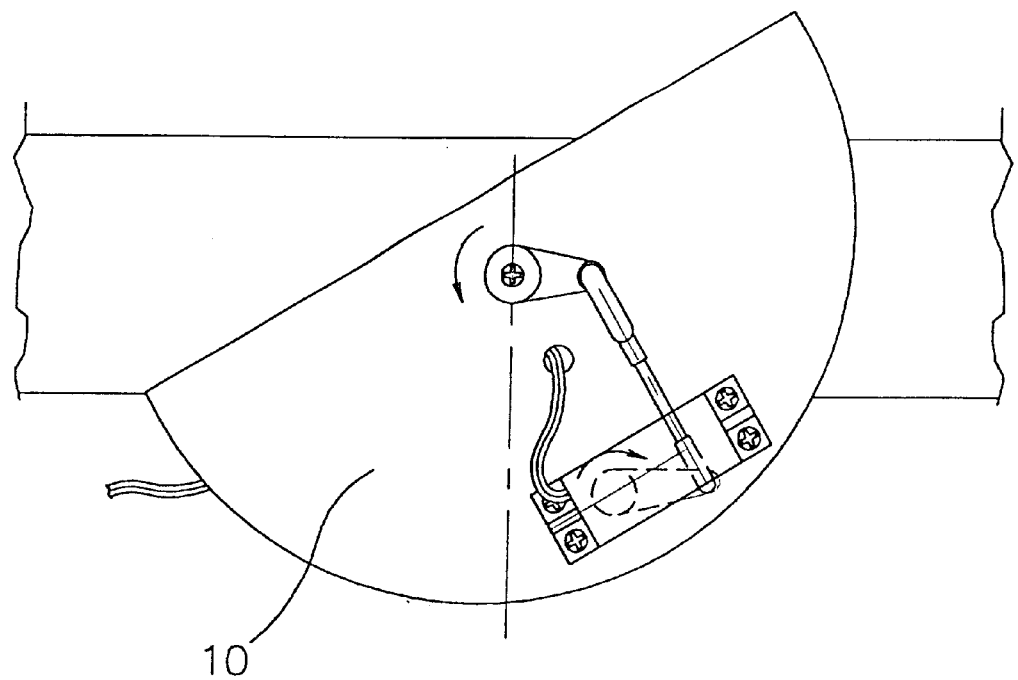
FIG. 2 is a schematic view of movement of the present invention.
Figure 2:
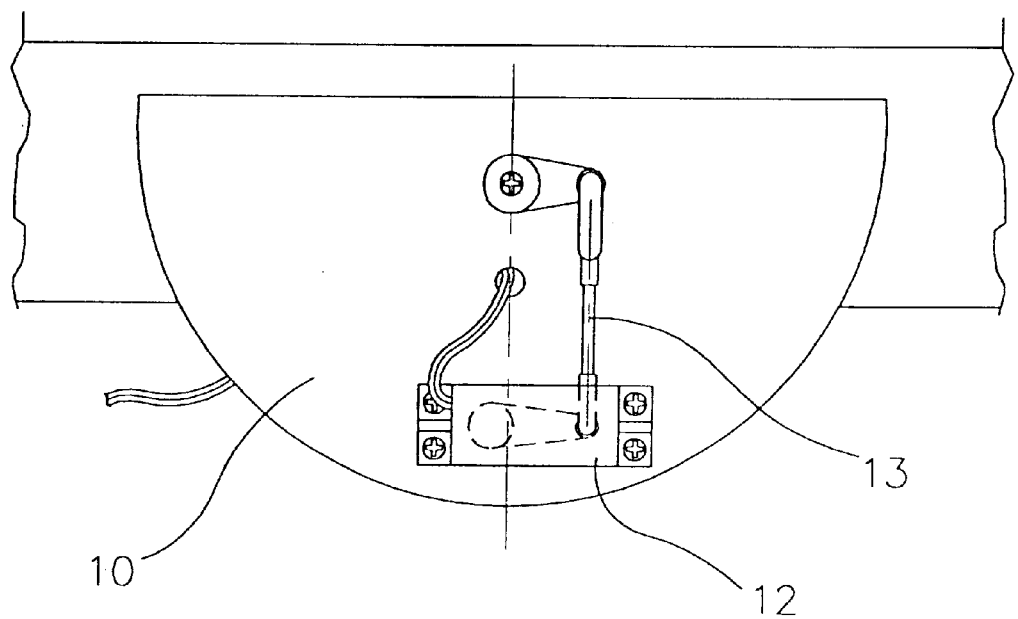

FIG. 1 is a schematic view of the present invention's headlight structure, in which the conventional car headlight is located at an inner side of the car body, installed in a recess, or installed by screwing the headlight structure 10 as shown in the figure at the proper place at the front of the car. The headlight structure 10 has a main shaft 101 screwed on it that connects the headlight structure 10 with the car body, so that there is enough space between headlight structure 10 and car body and the main shaft 101 serves as a pivot. Therefore the headlight structure 10 can turn left or right. Also, the automatic headlight structure 10 includes a head lampshade 11, behind which there is a space inside the headlight structure 10 for installation of a server 12. There is a shaft 13 connected at one end to the bottom of the server 12. The other end of the shaft 13 is connected with the main shaft 101 at a proper location, so that when the drive circuit of server 12 operates, it will also make shaft 13 and the main shaft 101 perform a circle movement (as shown at FIG. 2).

Figure 3:
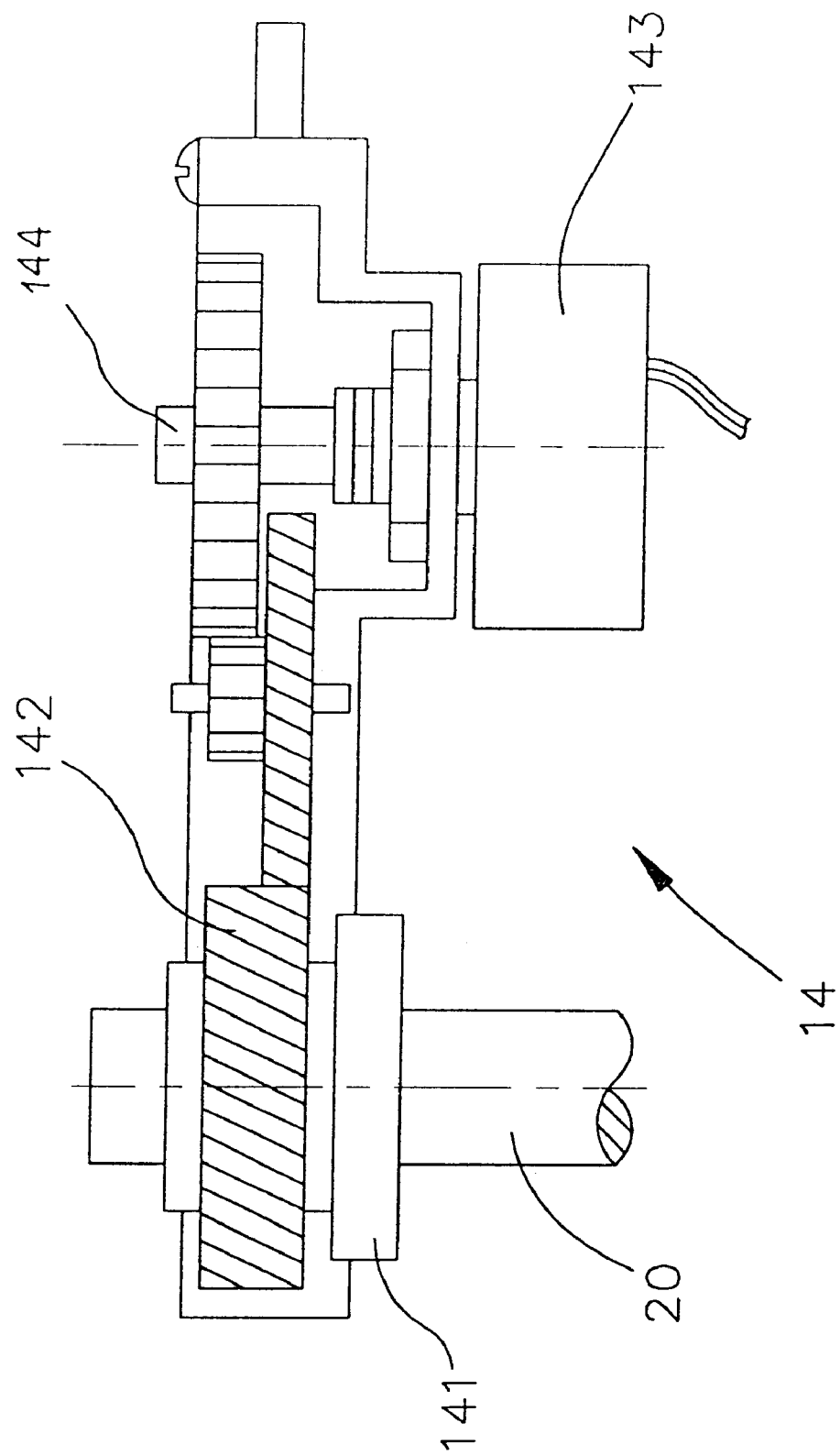
FIG. 3 is a schematic view of a running gear of the present invention.

FIG. 3 is a schematic view of a running gear of the present invention. A running gear 14 is on the steering wheel 20, as in a conventional vehicle structure. There are many parts and transmission devices inside the car body, but there is still additional space inside the vehicle. The running gear 14 of the present invention is composed of a compact gear wheel box, the size of which is very small and precise. A shaft cover 141 is provided on the steering wheel 20. (The size of shaft cover 141 depends on the model of the vehicle.) The shaft cover 141 is connected with a gear wheel 142, which controls the variable resistor 144 of the drive circuit to react. When the steering wheel is turning, its rotation is transmitted to the running gear 14 and variable resistor 144 to move, and variable resistor 144 and the control server make the headlight structure follow the movement of the steering wheel, turning in the same direction. The server 12 receives signals from the running gear 14 and moves left or right. Also, when the driver is driving on a crooked road, the movement of the steering wheel also makes the headlight structure 10 move immediately in the same direction. Therefore, this invention is not only convenient but is also practical.

Furthermore, while the running gear of present invention is composed of a gear wheel box, it can be replaced by an infrared sensor (not shown in figures), placed at a proper location at the steering wheel to detect the movement of the steering wheel and control the drive circuit to act, and then control the headlight structure to follow the movement of steering wheel.

Figure 4:
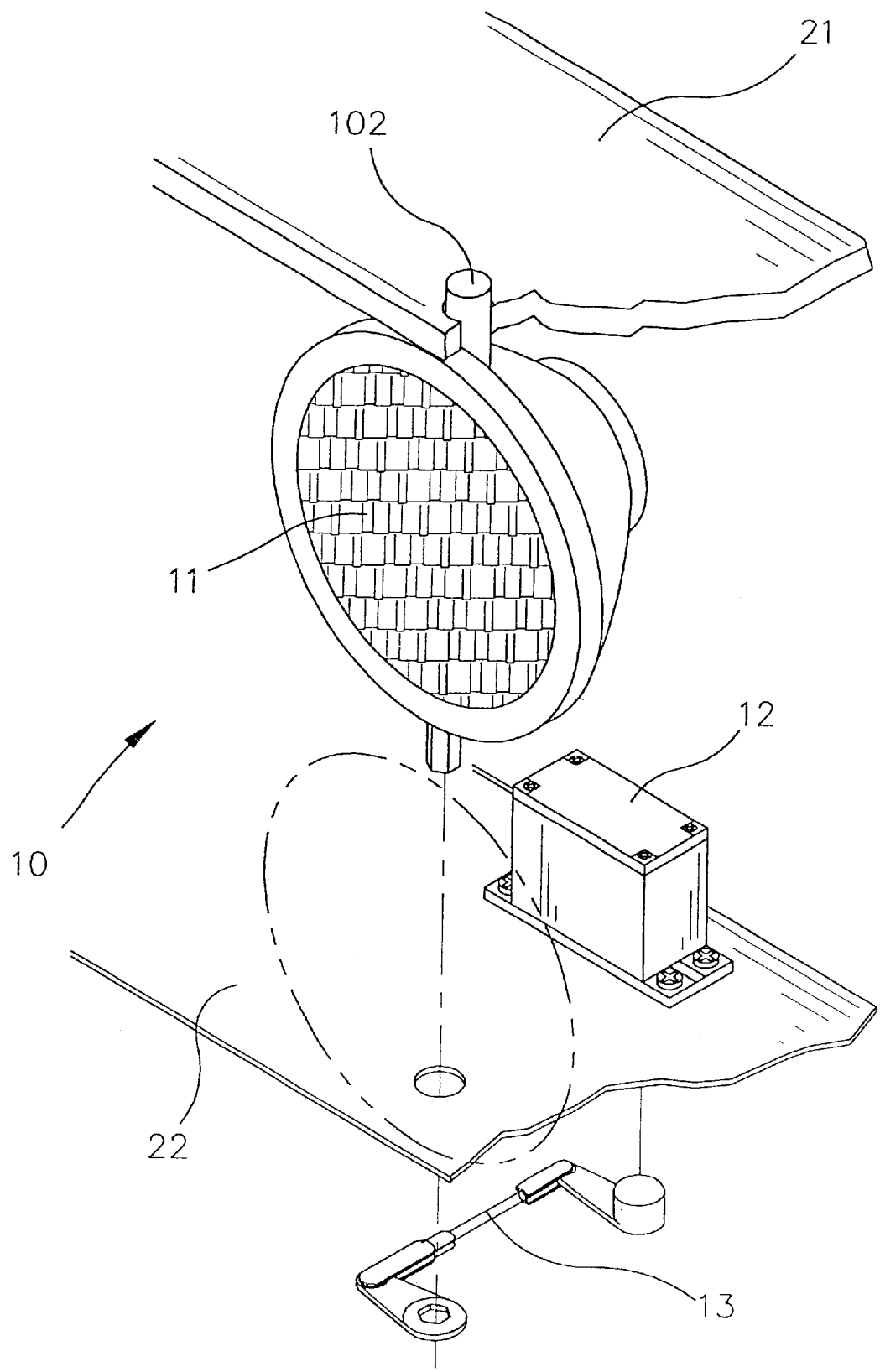
FIG. 4 is an example of the present invention
Figure 5:
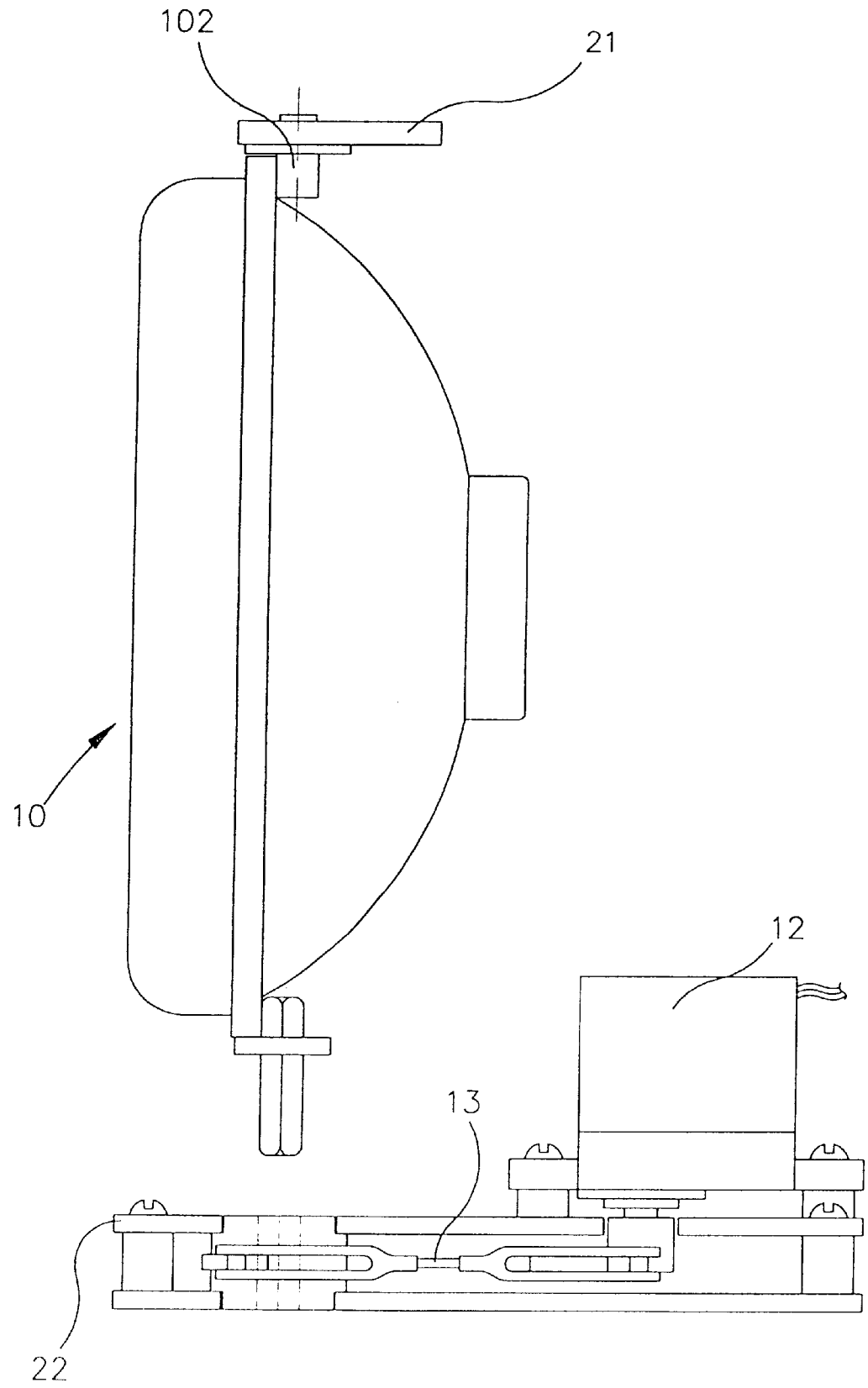
FIG. 5 is a sectional explodes view of the FIG. 4

FIG. 4 illustrates an example of the present invention, in which the headlight structure 10 can be placed at the proper location on bumper 21, or replace the original car headlight structure. The headlight structure can be placed at the top or bottom side of the bumper 21. There are two main shafts 102 at the top and bottom of the headlight structure 10. The top main shaft 102 inserts into the bumper 21, and the bottom main shaft 102 inserts into the partition 22. The server 12 is provided on the partition 22. The server 12 is also controlled by the running gear 14 (as shown in FIG. 3). When the driver is driving on a crooked road, the movement of the steering wheel also makes the headlight structure 10 move in the same direction immediately.

The headlight structure 10 of the present invention can be added as a fog lamp or the other lamp structure. It also can be installed on any kind of vehicle or as a basic device for a car; on the other hand, the headlight structure 10 can be added on the bumper or the location of the headlight. To avoid rubbing against the body of the car, the turning angle is 45 degree to the left and right sides, and the angle of turning can be adjusted.

Figure 6:
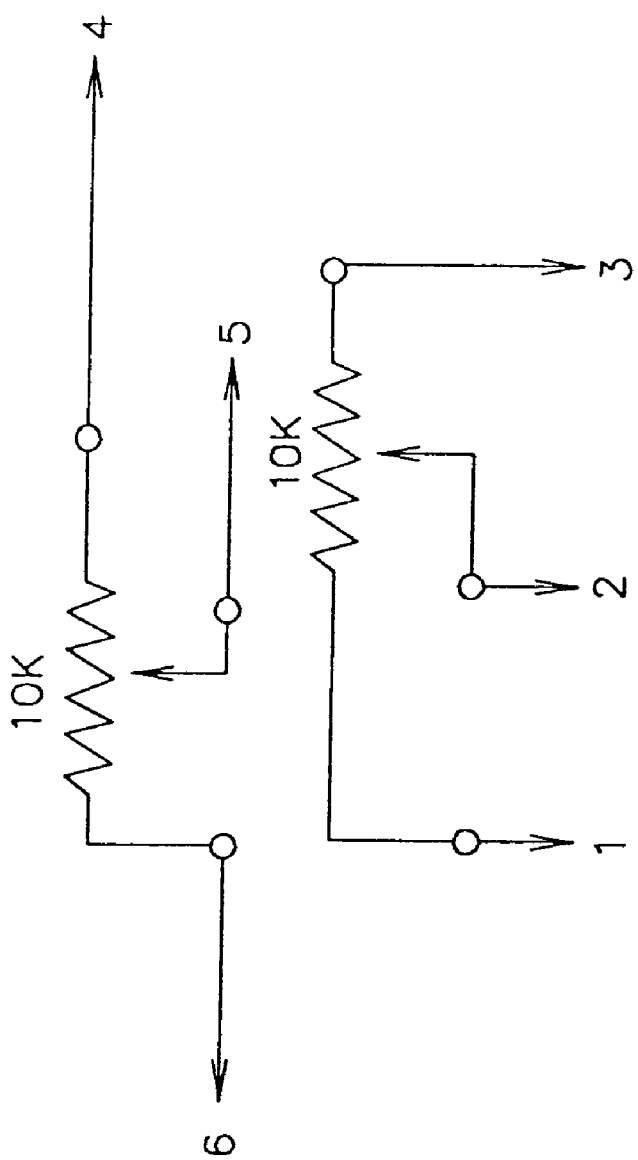
FIG. 6 is a circuit diagram for a circuit of a running gear of the present invention.
Figure 7:
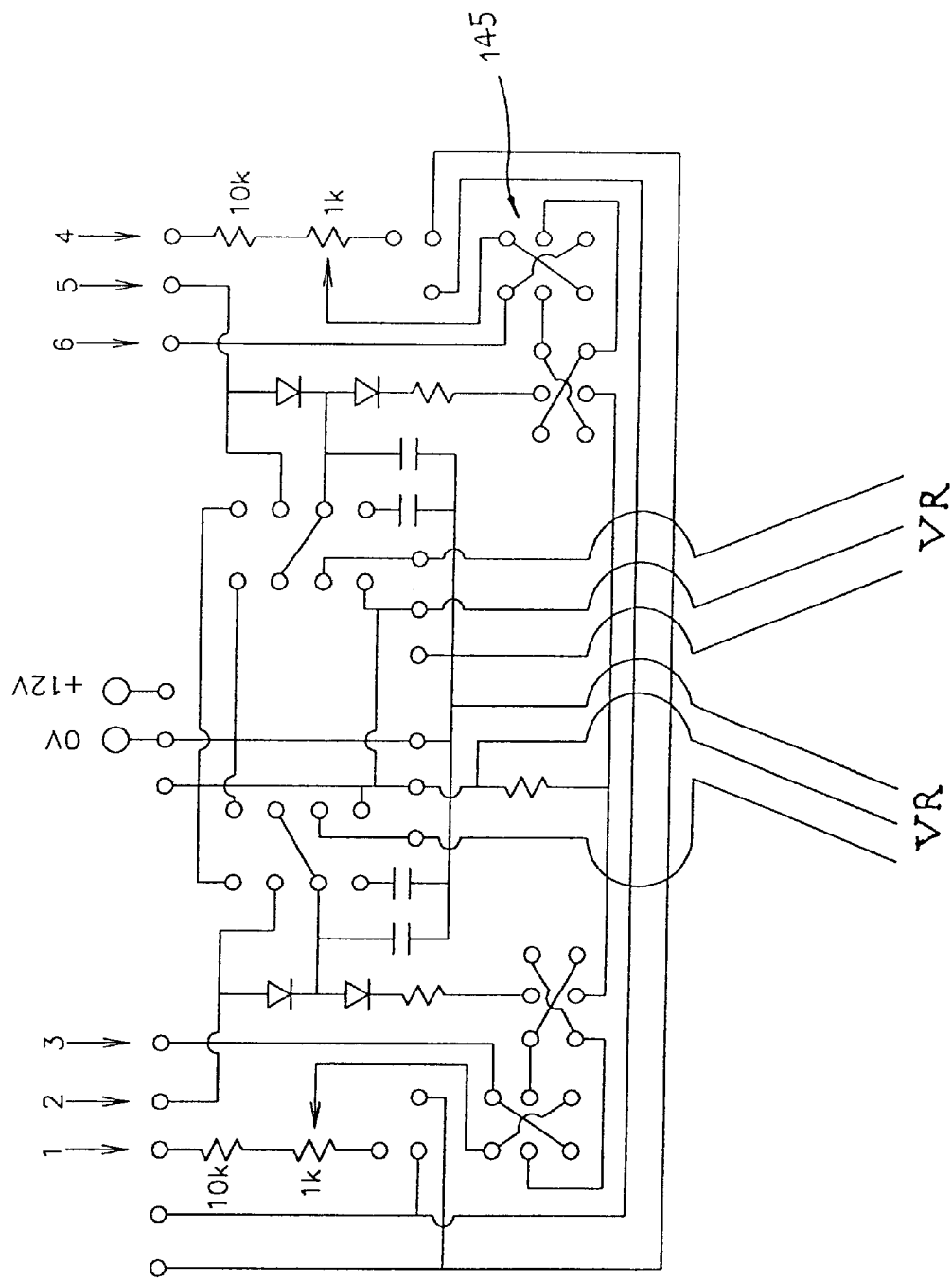
FIG. 7 is a circuit diagram for another circuit of a running gear of the present invention.

FIG. 6 and FIG. 7 are circuit diagrams of the present invention, where FIG. 6 shows the variable resistor and how it is connected with the drive circuit 143, to make the server work and then make the headlight structure move.

Furthermore, the headlight structure of the present invention can be a single structure installed on one side of the front of the car, and turn to the left or right by 45 degree with the steering wheel. It also can be installed on the two sides of the front of the car, so that when the steering wheel turns to the left, only the left side headlight structure will turn to the left, while the right headlight will still point straight forward. Similarly, when the steering wheel turns to the right, only the right side headlight structure will turn to the right, while the left headlight will still point straight forward. Also, the relay 145 of the circuit connects with the battery for when the car is backing up, so that the headlight structure will turn to the opposite side relative to the turning of the steering wheel when the vehicle is backing up, as compared to when the vehicle is not backing up, since it is more convenient for the driver to see clearly while backing up.

As seen according to the above, the present invention "Automatic turning headlight structure" has practical applicability and creativeness.

The embodiment mentioned above is only a better example for the present invention, and shall not restrict the range of embodiment of the present invention to it, and any modification or/and change made based on the present invention shall be considered to be covered by the present invention.

What is claimed is:

1. An automatic headlight turning structure, comprising:
   a headlight support structure defining an interior space for receiving a headlight, the support structure having a main shaft adapted for being rotatably mounted at a front end of an automobile;
   a server mounted in the interior space of the support structure, a secondary shaft coupled between the main shaft and the server, and means, including first and second variable resistors, for moving the secondary shaft to rotate the support structure and the headlight therewith from a straight-ahead lighting position, in a first light-turning direction with a change in the resistance of the first variable resistor, and for moving the secondary shaft to rotate the support structure and the headlight therewith from the straight-ahead lighting position in a second light-turning direction opposite the first light-turning direction with a change in the resistance of the second variable resistor;
   a compact gear wheel speed changing structure, coupled to the steering wheel of the automobile and the first variable resistor, so as to control the resistance of the first variable resistor with rotation of the steering wheel in a first steering direction from a straight-ahead steering position and so as to control the resistance of the second variable resistor with rotation of the steering wheel in a second steering direction opposite to the first steering direction, from the straight-ahead steering position, such that the headlight support structure rotates by an amount and in a direction corresponding to the rotation of the steering wheel; and
   means for altering responsiveness of the variable resistors to the rotation of the steering wheel when the automobile is backing up, so that the compact gear wheel speed changing structure controls the resistance of the second variable resistor with rotation of the steering wheel in the first steering direction from the straight-ahead steering position and controls the resistance of the first variable resistor with rotation of the steering wheel in the second steering direction from the straight-ahead steering position, so that the headlight support structure rotates with rotation of the steering wheel in an opposite direction relative to that when the automobile is not backing up.

2. An automatic headlight turning structure according to claim 1, wherein the means for altering responsiveness of the variable resistors includes relays.

3. An automatic headlight turning structure according to claim 1, wherein the headlight support structure is adapted for being rotatably mounted on a bumper at the front end of the automobile.

4. An automatic headlight turning structure according to claim 1, wherein the means for altering responsiveness of the variable resistors to the rotation of the steering wheel is responsive to activation of automobile back-up lights.

5. An automatic headlight turning structure, comprising:
   a headlight support structure defining an interior space for receiving a headlight, the support structure having a main shaft adapted for being rotatably mounted at a front end of an automobile;
   a server mounted in the interior space of the support structure, a secondary shaft coupled between the main shaft and the server, and means, including first and second variable resistors, for moving the secondary shaft to rotate the support structure and the headlight therewith from a straight-ahead lighting position, in a first light-turning direction with a change in the resistance of the first variable resistor, and for moving the secondary shaft to rotate the support structure and the headlight therewith from the straight-ahead lighting position in a second light-turning direction opposite the first light-turning direction with a change in the resistance of the second variable resistor;
   means, including an optical sensor, for detecting the position of the steering wheel of the automobile and controlling the resistance of the first variable resistor with rotation of the steering wheel in a first steering direction from a straight-ahead steering position and so as to control the resistance of the second variable resistor with rotation of the steering wheel in a second steering direction opposite to the first steering direction, from the straight-ahead steering position, such that the headlight support structure rotates by an amount and in a direction corresponding to the rotation of the steering wheel; and
   means for altering responsiveness of the variable resistors to the rotation of the steering wheel when the automobile is backing up, so that detecting and controlling means controls the resistance of the second variable resistor with rotation of the steering wheel in the first steering direction from the straight-ahead steering position and controls the resistance of the first variable resistor with rotation of the steering wheel in the second steering direction from the straight-ahead steering position, so that the headlight support structure rotates with rotation of the steering wheel in an opposite direction relative to that when the automobile is not backing up.

6. An automatic headlight turning structure according to claim 2, wherein the means for altering responsiveness of the variable resistors includes relays.

7. An automatic headlight turning structure according to claim 2, wherein the headlight support structure is adapted for being rotatably mounted on a bumper at the front end of the automobile.

8. An automatic headlight turning structure according to claim 5, wherein the means for altering responsiveness of the variable resistors to the rotation of the steering wheel is responsive to activation of automobile back-up lights.

* * * * *